(12) United States Patent
Quiring et al.

(10) Patent No.: US 6,434,167 B1
(45) Date of Patent: Aug. 13, 2002

(54) COMMUNICATIONS DEVICE WITH EXTENDED FILTER AND LINE MONITORING FUNCTION

(75) Inventors: Keith L. Quiring, Dallas; Alan Gatherer, Richardson; Murtaza Ali; Ray A. King, both of Plano, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/152,423

(22) Filed: Sep. 11, 1998

Related U.S. Application Data

(60) Provisional application No. 60/071,993, filed on Jan. 20, 1998.

(51) Int. Cl.⁷ .................................................. H04J 1/02
(52) U.S. Cl. ........................ 370/493; 370/497; 375/222
(58) Field of Search ................................. 370/465, 466, 370/468, 493, 497, 276, 290, 480; 375/222

(56) References Cited

U.S. PATENT DOCUMENTS

| | | | | |
|---|---|---|---|---|
| 4,910,799 A | * | 3/1990 | Takayama | 455/296 |
| 4,939,789 A | * | 7/1990 | Sakashita et al. | 455/260 |
| 5,512,898 A | * | 4/1996 | Norsworth et al. | 341/155 |
| 5,982,785 A | * | 11/1999 | Woerner et al. | 370/488 |
| 5,991,336 A | * | 11/1999 | Scholtz et al. | 375/222 |
| 6,044,107 A | * | 3/2000 | Gatherer et al. | 375/222 |
| 6,144,659 A | * | 11/2000 | Nye et al. | 370/359 |

* cited by examiner

Primary Examiner—Ricky Ngo
(74) Attorney, Agent, or Firm—J. Dennis Moore; W. James Brady, III; Frederick J. Telecky, Jr.

(57) ABSTRACT

A communications device (100) with an extended filter (74) provides more bandwidth for V.34, V.90 and other data communications protocols. The device (100) permits voice and data communications over the same twisted pair connection (22) to a central office facility (35) and allows an increased data rate between a subscriber (15) and the central office linecard (50). A variable frequency filter (74) capable of switching between "voice" mode and "data" mode is used. In "data" mode, the bandwidth of filter (74) is extend to provide more bandwidth which can be utilized to transfer data. A line monitoring mechanism (102) is provided which monitors the PCM data flowing over a digital backplane (60) as well as requests from a subscriber for an increased data rate connection. A micro-controller (104) can be provided to adjust the bandwidth of the filter (74) and cause it to enter "data" mode.

15 Claims, 3 Drawing Sheets

COMMUNICATIONS DEVICE WITH EXTENDED FILTER AND LINE MONITORING FUNCTION

This application claims priority under 35 USC §119(e)(1) of provisional application Serial No. 60/071,993 filed Jan. 20, 1998, the entirety of which is incorporated herein by reference.

TECHNICAL FIELD

The invention relates generally to data communications and more particularly to high speed telecommunications over a twisted pair connection.

BACKGROUND OF THE INVENTION

The sudden popularity of the Internet and other similar wide area communications platforms has led to an intense push for higher data transmission rates over twisted pair wiring. Most residential Internet users access the Internet through a local Internet Service Provider (ISP). The service provider communicates with subscribers over the Public Switched Telephone Network (PSTN). Since most users access the Internet through a twisted pair As a result, the demand for increased data transmission rates over analog twisted pair wiring is at an all time high. The most recent widespread standard is "56K" analog modem technology developed by U.S. Robotics and Rockwell/Lucent. While these technologies will not generate true 56 kbps performance under typical subscriber line conditions, they do provide a boost in performance from the previous standard of bidirectional 33.6 kbps.

Theoretically, a connection of 64 kbps should be attainable between the subscriber and the Internet Service Provider (ISP) via a standard Plain Old Telephone Service (POTS) connection. This is because 64 kbps is the rate at which data is transferred from the central office linecard to the ISP or other remote terminal. Several factors prevent this from happening including imperfect line conditions and varying local loop lengths common to POTS analog networks. The primary reason, however, for this less than the theoretical transmission rate is that the PSTN was designed to carry voiceband frequencies in the range of 300–3.4 KHZ.

Communications protocols such as Asymmetric Digital Subscriber Lines (ADSL) have been developed to increase the effective bandwidth of existing twisted pair wiring. Ideally, such communications protocols would allow both voice and data communications capabilities over the same twisted pair connection. This eliminates the need to develop a new infrastructure to accommodate increased transmission rates and provides a feasible solution for increased data transmissions for the near future.

A problem associated with using the same twisted pair connection to carry both voice and data signals is that the PSTN limits the useful spectrum of the data signal component. Most POTS devices assume that signals above the 3.4 kHz point contain too much noise for reliable clear voice communications. On the other hand, advances in digital signal processing now permit the resolution of signals past the 3.4 kHz barrier for reliable digital communications. In addition, improved modulation schemes and error correction protocols permit recovery of the underlying digital data contained in the analog carrier.

SUMMARY OF THE INVENTION

The invention overcomes the limitation in bandwidth of twisted pair connection between the user and the linecard at the central office facility (CO) by permitting increased downstream and upstream rates using an analog modem communicating over the PSTN.

According to one embodiment, a communications device with an extended Plain Old Telephone Service ("POTS") filter is disclosed that provides more bandwidth for V.34, V.90 and other data communications protocols. The device comprises an analog interface coupled for coupling to a PSTN twisted pair connection and having a variable bandwidth analog filter; a digital interface couples the device to a digital backplane; a signal conversion circuit is interspersed between the analog interface and the digital interface; a control circuit is operably coupled to the filter and configured to adjust its roll-off point depending on the connection type between a user and the central office. For example, in a data connection, the control circuit can extend the frequency roll-off point of the filter to 3.8 kHz permitting the use of more bandwidth than is achieved in a typical POTS connection.

According to another embodiment, the communications device can be utilized as a central office linecard with a variable frequency filter with a roll-off point at 3.8 kHz and 14 dB attenuation at 4 kHz. During standard voice communications, the roll-off point of the filter is 3.4 kHz corresponding to a POTS band.

According to another embodiment, the same general purpose architecture of the linecard device with an extended roll-off is employed in a modem suitable for use by the subscriber. The modem employs an analog interface to a twisted pair connection coupling the subscriber to their local central office for data communications. The modem can accommodate multiple modulation and/or transmission protocols such as V.34, V.34+ and/or V.90. When a central office linecard with a variable frequency filter is provided in the central office facility, the modem allows increased data mode communications using bandwidth outside the traditional POTS spectrum.

Since the A/D and Digital to Analog (D/A) components can withstand lower signal-to-noise ratios, increased transmission is realized by extending the filters to 3.8 KHz or 4.0 kHz, approximately.

According to still another embodiment, the linecard incorporates a line monitoring mechanism that enable the linecard to determine when a data connection has been initiated. The line monitoring mechanism monitors the Pulse Code Modulated (PCM) data received from the interface to the service provider on the digital backplane. A certain amount of intelligence is employed in the line monitoring mechanism to cause the variable frequency filter to extend when a data connection has been initiated.

A technical advantage of the invention is that it provides the user with increased bandwidth over the same twisted pair connection used for POTS.

Another technical advantage of the invention is that it permits both voice and data communications using a single communications device.

Yet another technical advantage of the invention is that it permits replacement of the existing linecard in the CO with the linecard of the present invention enabling hardware changes at the CO to provide the increased bandwidth. Thus, a standard modem can be used to establish a connection with the CO and the use can still realize increased data communications.

BRIEF DESCRIPTION OF THE DRAWINGS

Other aspects of the invention including specific implementations are understood by reference to the following detailed description taken in conjunction with the appended drawings in which.

References in the figures correspond to like numerals in the detailed description unless otherwise indicated.

DETAILED DESCRIPTION OF PREFERRED EMBODIMENTS

Figure 1:
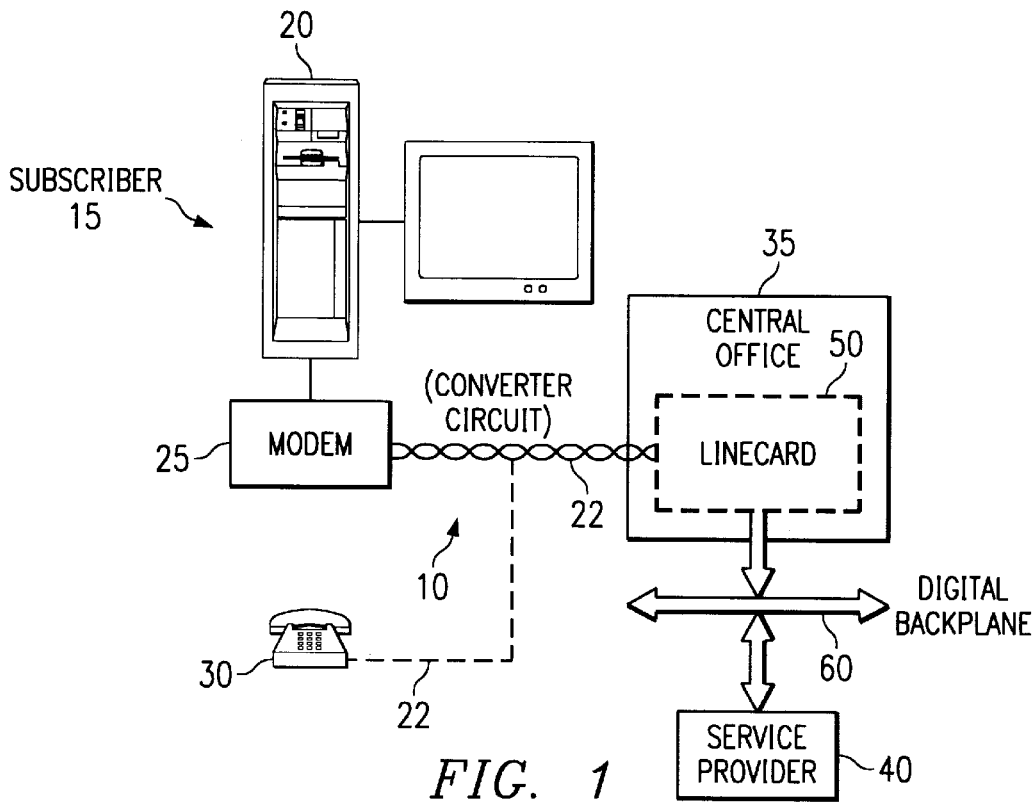
FIG. 1 is a diagram illustrating a communications system wherein the invention can be practiced.

Referring first to FIG. 1, therein is illustrated an exemplary communications system 10 in which the invention can be practiced. In general, the communications system 10 provides a platform for a subscriber 15 to communicate with a service provider 40 through the central office 35. The coupling medium, routing and switching equipment and other facilities employed in the communications system 10 to connect a call placed by the subscriber 15 to the service provider 40 are typically part of a Public Switched Telephone System (PSTN). The subscriber 15 has the transmission/reception and data processing equipment 20 necessary to gain access to the service provider 40 over the communications system 10.

As shown, a modem 25 and Plain Old Telephone System (POTS) 30 are coupled to the central office 35 through a twisted pair connection 22. The twisted pair connection 22 is copper-based wiring of the type often employed in many PSTN installations with transmission characteristics suitable for voice-band applications. As indicated by the dashed line, the twisted pair connection 22 may be shared by both the POTS 30 and modem 25 to access to the central office 35. In other embodiments, the modem 25 and POTS 30 use separate connections to the central office 35.

In operation, the modem 25 transmits and receives analog signals over the communications twisted pair connection 22 to and from the central office 25. The modem 25 is configured to transmit data across the twisted pair connection 22 to other subscribers and to service providers on the communications system 10. The modem 25 also functions as a reception device for receiving information from other subscribers and service providers.

Typically, the modem 25 connects with a the central office linecard 50 in the central office 35. The transmit and receive functions of the modem 25 and the linecard in the central office 35 can be implemented using known methods and devices. For example, the communications protocol between the modem 25 and the central office linecard 50 may include those supported and standardized by the International Standard Organization, the International Telephone and Telegraph Consultative Committee and the Electronics Industry Association among others.

The POTS 30 is a standard telephone set used by the subscriber 15 in their home, business or other location. Typically, the subscriber 15 can use both the POTS 30 and the modem 25 for both voice and data communications on twisted pair connection 22. The service provider 40 can be an Internet Service Provider (ISP) which permits access by a large number of subscribers over the communications system 10. The digital backplane 60 provides the interface between the central office linecard 50 and the service provider 40. The communications protocol between the service provider 40 and the linecard 50 can vary, but often the devices employ Pulse Code Modulated (PCM) signals to communicate with each other over the digital backplane 60.

Often the service provider 40 acts as a gateway to a plurality of other host services (not shown) which contain a wide array of information and services available to the subscriber 15. Similarly, the central office 35 provides the routing mechanism for calls placed by the subscriber 15 either through modem 25 or POTS 30.

The invention has particular application with respect to the communications data rate between the modem 25 and central offices linecard 50 in the central office 35. In particular, the invention is directed at an improved data communications devices that can be employed in either the modem 25 or linecard 50 to increase the data transmission rate over the twisted pair connection 22 and permit voice and data communications over the same twisted pair connection 22.

Figure 2:
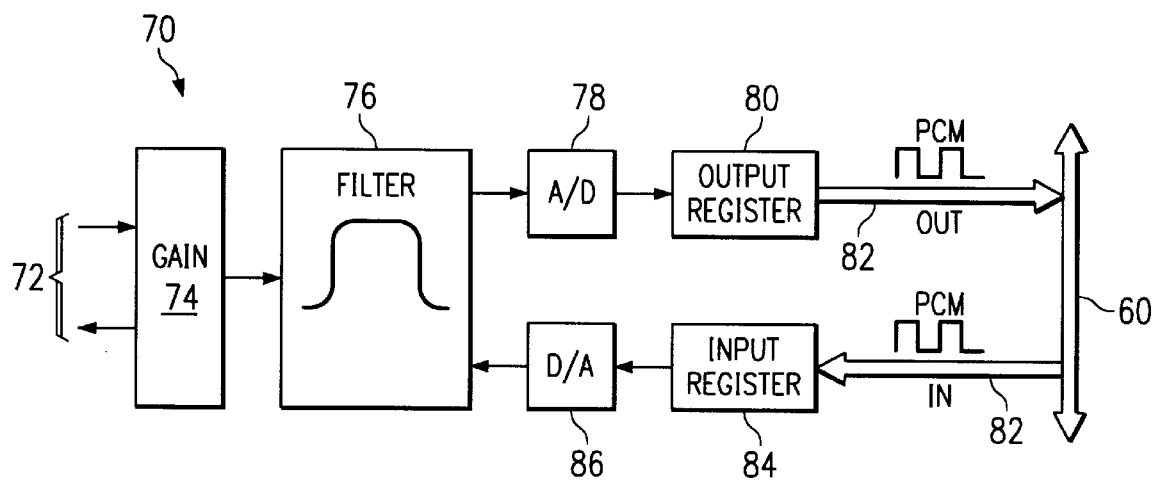
FIG. 2 is a block diagram of a data communications device according to one embodiment of the invention.

In reference to FIG. 2, a block diagram of a communications device 70 according to one embodiment is shown. The communications device 70 can be utilized in a wide array of applications. For example, the linecard 50 in the central office 35 can include the general architecture of the communications device 70 to achieve the advantages of the invention. Alternatively, a modem can also incorporate the general design aspects of communications device 70. Other applications will become apparent to those of ordinary skill.

As shown, at the central office 35 an analog interface 72 is used to couple analog signals from the twisted pair connection 22, which connects the data processing equipment 20 of the subscriber 15 to the linecard 50. A gain block 74 compensates for line losses which may occur in transmission and adapts incoming and outgoing signals accordingly to ensure a sufficiently high signal-to-noise ratio. After appropriate amplification at the gain block 74, the analog signals are passed through filter 76 which removes extraneous signals outside the frequency band of interest. Preferably, the cutoff frequency of the filter 76 can be adjusted to enable voice and data transmissions according to the invention. In particular, the fact that filter 76 has a variable cut-off frequency enables the increased data transmission rates of the present invention.

In one embodiment, the filter 76 provides a cut-off frequency of approximately 3400 Hz corresponding to a POTS bandwidth. In another embodiment, the filter 76 can be extended to have a cut-off frequency of 3.8 kHz with a roll-off such that 14 dB attenuation occurs at 4 kHz with a sampling rate of 8.0 kHz.

Filtered analog signals pass through Analog-to-Digital (A/D) converter 78 which implements a well known analog to digital conversion function using the appropriate clock sampling rate. The output of the A/D converter 78 are digital data sequences which enter the output register 80. The digital data sequences are formatted into Pulse Code Modulated (PCM) signals which are transmitted on the digital backplane 60.

The digital backplane 60 comprises the various facilities including communications mediums (cabling, connectors, etc . . . ) and mechanisms (routers, gateways, switches, etc . . . ) employed to provide high rate digital communications between a central office linecard 50 and other entities on the communications system 10. Typically, such facilities are installed, maintained and administrated by a third party administrator such as a long distance company, local exchange carrier or other similar communications entity. As shown, the communications device 70 has an interface 82 to the digital backplane 60 that allows the device 70 to communicate with other network entities over the digital backplane 60.

In the upstream direction, PCM data received from other network entities, such as service provider 40, arrives over the digital backplane 60 and reaches the digital interface 82 of the communications device 70. The PCM data is transferred to an input register 84 and then to the Digital-to-Analog Converter (DAC) circuit 86 of the device 70. The utilization of output register 80 and input register 84 in the device 70 is exemplary of one way to transfer data between the device 70 and the digital backplane 60 and it should be understood that other means of achieving the same function may be implemented as is known to those of ordinary skill.

Data from the input register 84 is then transferred to the DAC 86 where it is converted to equivalent analog signal waveforms using appropriate modulation rules employed in the communications system 10. Analog signals within the frequency range of filter 76 pass to the gain block 74 where they are massaged and amplified for transmission on the twisted pair connection 22 through analog interface 72.

Figure 3:
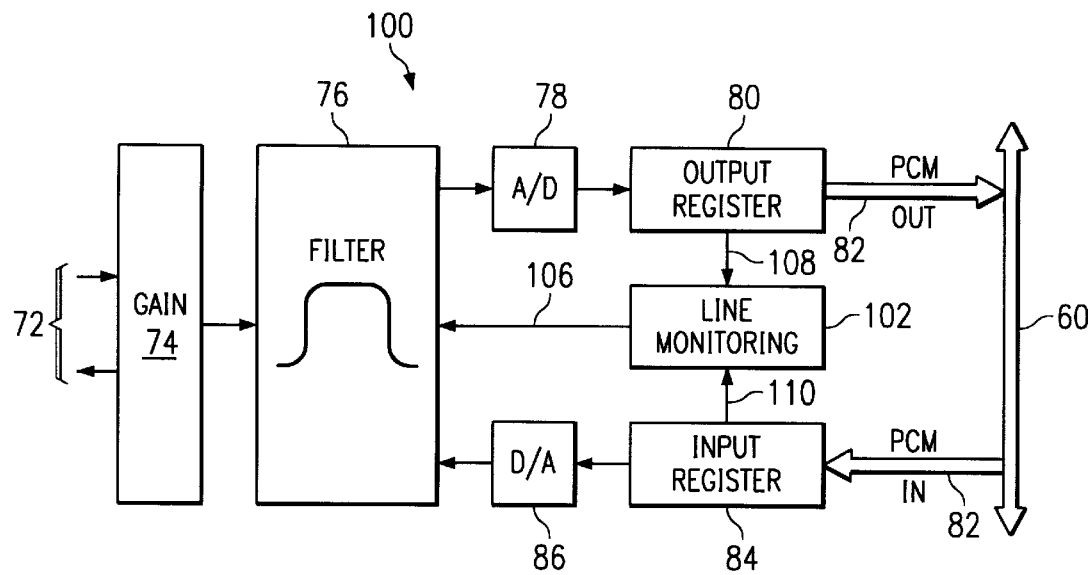
FIG. 3 is a block diagram of a data communications device according to a second embodiment of the invention.

Referring to FIG. 3, a modified version of the communication device 70 according to one embodiment is shown and denoted generally as 100. As shown, communications device 100 includes a line monitoring mechanism 102 coupled to variable frequency filter 76. The fact that the line monitoring mechanism 102 is provided enables the communication device 100 to detect codes inherent to the data communications protocol employed by the service provider 40 or subscriber 15. By detecting such codes, the communications device 100 is able to cause filter 76 to automatically extend its bandwidth since a data connection has been confirmed.

The line monitoring mechanism 102 can extend the bandwidth of the variable frequency filter 76 from POTS or "voice" mode to "data" mode. Implementation of the line monitoring mechanism 102 can be achieved in a variety of ways as long as its overall function is consistent with this description. For example, the line monitoring mechanism 102 can be part firmware, part software and part hardware and can be implemented as a discrete microprocessing device with hard-wired intelligence. Alternatively, the line monitoring mechanism 102 can include an instruction driven core such as those used in commonly available microprocessors. Other ways of implementing the line monitoring mechanism 102 will be apparent to those of ordinary skill.

Either the subscriber 15 or the service provider 40 may initiate a data connection with the communications device 100 through the twisted pair connection 22 or the digital backplane 60. A call from a service provider would reach the interface 82 and be intercepted by the input register 84. Preferably, line recognition mechanism 102 is configured to "hear" codes present in the communications protocol employed for data transmissions over the network. The codes, in turn, tell the central office linecard 50 that a data connection has been initiated.

Thus, the line monitoring mechanism 102 determines when a data connection has been initiated and causes the filter 76 to extend beyond a typical POTS 74 bandwidth. As shown, the line monitoring mechanism 102 is operably coupled to the filter 76 through path 106 which provides a control path between to the filter 76 and permits the line monitoring mechanism 102 to control the bandwidth characteristics thereof.

According to one embodiment of the invention, filter 76 operates in "voice mode" by default corresponding to the bandwidth characteristic of a POTS call. As can be appreciated by those of ordinary skill, POTS typically operates within a bandwidth of between 200 and 3.4 kHz for voice communications over twisted pair telephone wiring.

Preferably, filter 76 has the ability to extend its upper frequency cut-off point beyond 3.4 kHz. The fact that the filter 76 is able to extend its upper bandwidth cut-off point beyond 3.4 kHz enables the increased data rate transmission advantages of the present invention. In one embodiment, when the line monitoring mechanism 102 detects a code associated with a data connection, it causes the filter 76 to extend its upper frequency cut-off point to as close to 3.8 kHz with a 14 dB attenuation at 4.0 kHz. The filter 76 is then in "data" mode and provides more room for the protocol to use.

The monitoring ability of the line monitoring mechanism 102 is supported by the signal paths 108 and 110 between the output register 80 and input register 84, respectively. In this manner, the line monitoring mechanism 102 is able to detect codes from all network entities across the communications system 10. It should be understood however, that other means of monitoring codes over the communications system 10 can be employed.

Figure 4A:
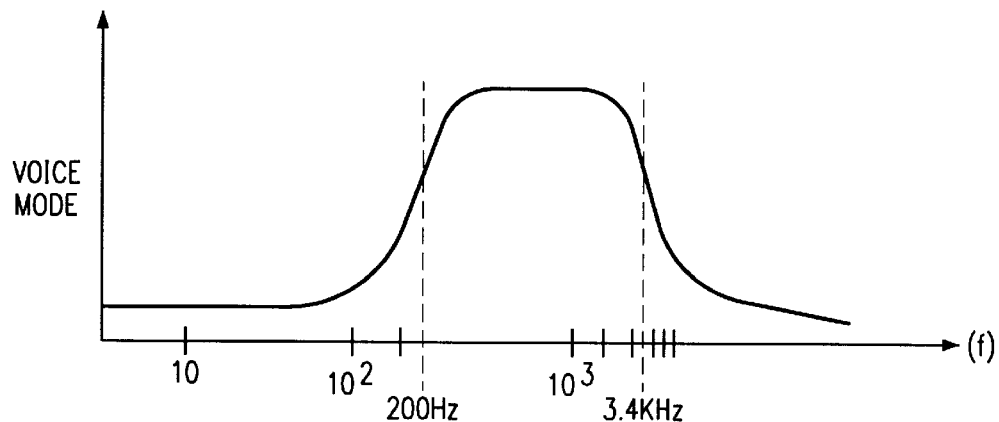
FIG. 4 shows the bandwidth characteristics of a filter suitable for use in a data communications device according to the invention.
Figure 4B:
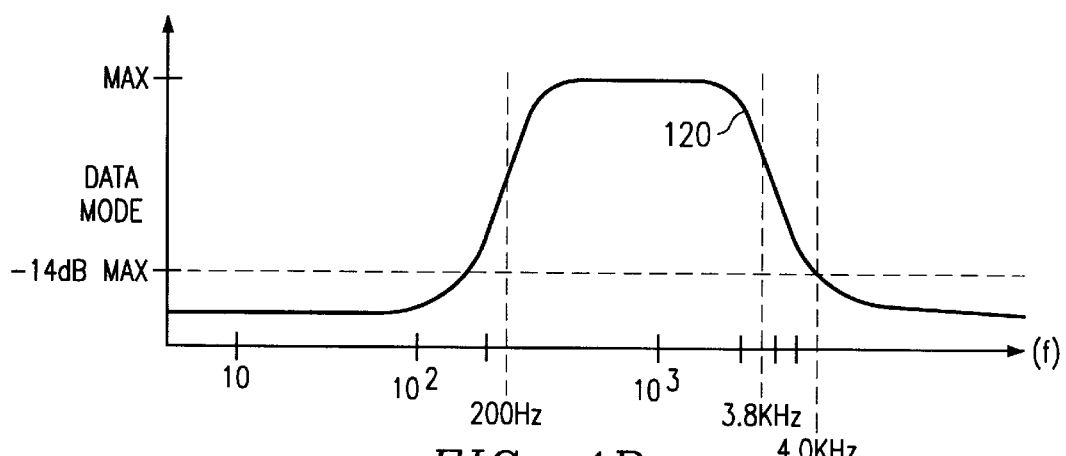

Turning now to FIGS. 4A and 4B, the bandwidth characteristics of the filter 76 in both "voice" mode and "data" mode are shown. The graph of FIG. 4A indicates the roll off points for voice mode operation of the filter 76 corresponding to a typical POTS call. The output of filter 76 is active in the range of 200 Hz to 3.4 kHz. Once a data call mechanism 102 which, in turn, causes the filter 76 to extend its upper cut-off point beyond 3.4 kHz. Alternatively, the analog signals from the subscriber 15 can be sampled beyond 3.4 kHz taking into account that signal attenuation has occurred.

The increased bandwidth is indicated by line 120 in the graph of FIG. 4B corresponding to "data" mode. While filters capable of passing a the signal beyond 3.4 kHz are available, their use to increase the frequency spectrum for transmission over twisted pair wiring has not, until the present invention, been previously contemplated. Thus, the fact that a filter 76 is able to switch between a "voice" mode and "data" mode extends the available bandwidth of a communication system 10 by providing more room for the communications protocol employed.

The increased bandwidth is therefore available in combination with a wide array of communication protocols and/or modulation schemes. Between the subscriber 15 and the service provider 40, the additional bandwidth allows an increased density of the signals transmitted over the twisted pair connection 22. In this way, manufacturers can design communication devices capable of utilizing the additional spectrum.

Figure 5:
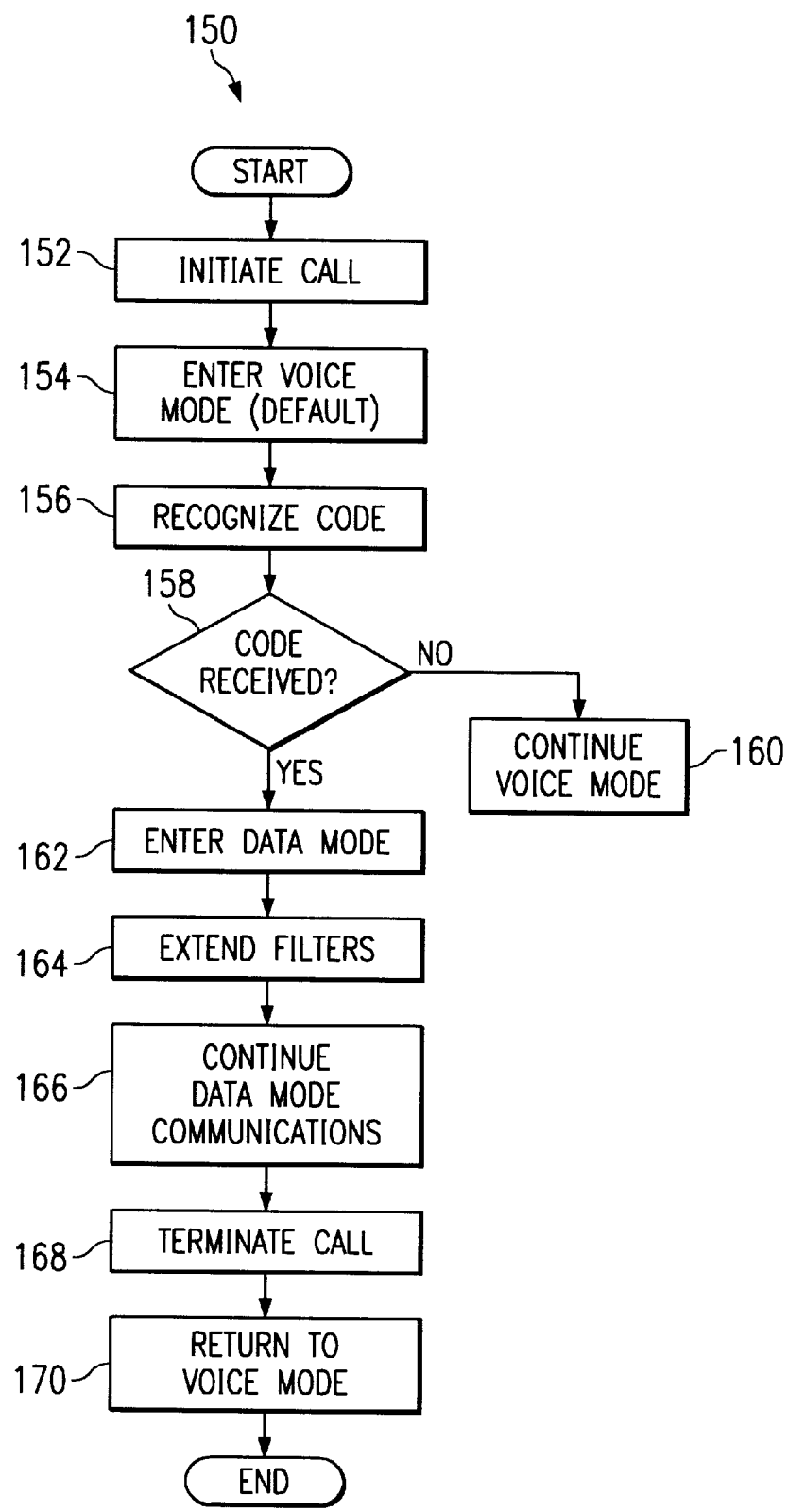
FIG. 5 is a process flow diagram of a method for achieving increased transmission rates according to one embodiment.

Turning now to FIG. 5, a process flow diagram for a method of initiating "data" mode in a communications device such as a modem or central office linecard 50 is shown and denoted generally as 150. Process 150 commences when a call is initiated, step 152, from the subscriber side. At this point, the central office linecard 50 does not know whether the call is a POTS or data call from a modem. At step 154, the linecard 50 enters a voice mode by default. This corresponds to the filter 76 having an upper cut-off frequency of 3.4 kHz.

Next, process 150 is directed to step 156 wherein the linecard 50 senses a data connection is initiated by either the service provider 40 or the subscriber 15 by listening for codes in the communications protocol. As described herein, the request can be sensed by the line monitoring mechanism 102 or other similar means. The determination of whether a code is received is made at process step 158. Thus, if neither the subscriber through his modem 25 or a service provider 40, transmits a code the connection continues in "voice" mode as indicated in step 160.

On the other hand, if a predetermined code is received, process flow is directed to step 162 wherein the linecard 50 enters "data" and filter 76 operates with an extended bandwidth. Process 150 is then directed to step 164 wherein the filter 76 is extended as close to 4.0 kHz as possible.

Communications continue in "data" mode with the increased bandwidth of the filter 76 available for transmission, step 166. Once the communication session is over, the call is terminated at step 168 and linecard 50 returns to "voice" mode at step 170. Process 150 then ends.

While the invention has been described in conjunction with preferred embodiments, it should be understood that modifications will become apparent to those of ordinary skill in the art and that such modifications are intended to be included within the scope of the invention and the following claims.

What is claimed is:

1. A communications device permitting voice and data communications over the same twisted pair connection comprising:

an analog interface coupled to the twisted pair connection;

a variable frequency filter coupled to said analog interface and having an output terminal;

a signal conversion circuit having an input terminal coupled to said output terminal of said variable frequency filter and an output terminal; and a line monitoring mechanism operably coupled to said variable frequency filter and configured to adjust a bandwidth of said variable frequency filter when a data connection is initiated over said twisted pair connection.

2. The device according to claim 1 wherein the line monitoring mechanism can extend the upper frequency roll-off point of said variable frequency filter to approximately 3.8 kHz.

3. The device according to claim 2 wherein the attenuation of said variable frequency filter at 4.0 kHz is approximately 14 dB.

4. The device according to claim 1 further comprising a digital interface coupled to said output terminal of said signal conversion circuit.

5. The device according to claim 4 wherein said line monitoring mechanism is configured to detect codes contained within the communications protocol employed on the same twisted pair connection.

6. The device according to claim 5 wherein said code recognition mechanism is capable of detecting codes received on the digital interface from other network entities.

7. The device according to claim 1 wherein said line monitoring mechanism contains an instruction driven core capable of determining whether a POTS call or a data call has been initiated over said twisted pair connection.

8. A central office linecard comprising:

an analog interface to a twisted pair connection;

a signal converter having an input coupled to the analog interface and an output;

a digital interface to a digital backplane, said interface coupled to the output of said signal converter; and a variable frequency filter coupled to said analog interface, the bandwidth of said filter being a function of the call type sensed either over said analog interface or said digital backplane.

9. The central office linecard according to claim 8 wherein said variable frequency filter defaults to a bandwidth appropriate for a Plain Old Telephone Service (POTS) connection.

10. The central office linecard according to claim 8 wherein said variable frequency filter can extend to a bandwidth greater than that employed for a Plain Old Telephone Service (POTS) connection.

11. The central office linecard according to claim 8 wherein said variable frequency filter automatically adjusts to pass voice band frequencies when a POTS connection is received by the central office linecard.

12. The central office linecard according to claim 8 wherein said variable frequency filter adjusts to pass frequencies outside the voice band when a data connection is received by the central office linecard.

13. The central office linecard according to claim 8 further comprising a line monitoring mechanism having a first input coupled to said digital interface and configured to sense when data call is placed to the central office linecard over the digital backplane.

14. The central office linecard according to claim 13 wherein said line monitoring mechanism includes a second input coupled to said analog interface and configured to sense when data call is placed to the central office linecard over the twisted pair connection.

15. The central office linecard according to claim 8 wherein said signal converter is comprised of:

an analog to digital converter interspersed between the output of said variable frequency filter and said digital interface; and a digital to analog converter interspersed between said digital interface and the input of said variable frequency filter.

* * * * *